US012608213B2

(12) United States Patent　(10) Patent No.: US 12,608,213 B2
McNulty et al.　(45) Date of Patent: Apr. 21, 2026

(54) SECURE MOTHERBOARD REPLACEMENT SYSTEM AND METHOD

(71) Applicant: Dell Products L.P., Round Rock, TX (US)

(72) Inventors: Kearson M. McNulty, Austin, TX (US); Marcus Daniel Molner, Austin, TX (US); Jimmy L. Griffith, Pflugerville, TX (US); Trent A. Buys, Seattle, WA (US); David Allen Dyson, Pflugerville, TX (US); Suraj M Varma, Portland, OR (US); Walter Kemp, Georgetown, TX (US)

(73) Assignee: Dell Products L.P., Round Rock, TX (US)

( * ) Notice: Subject to any disclaimer, the term of this patent is extended or adjusted under 35 U.S.C. 154(b) by 120 days.

(21) Appl. No.: 18/788,257

(22) Filed: Jul. 30, 2024

(65) Prior Publication Data

US 2026/0037271 A1　Feb. 5, 2026

(51) Int. Cl.
| *G06F 9/4401* | (2018.01) |
| *G06F 9/445* | (2018.01) |
| *G06F 21/10* | (2013.01) |
| *G06F 21/12* | (2013.01) |
| *G06F 21/44* | (2013.01) |
| *H04L 9/40* | (2022.01) |

(52) U.S. Cl.
CPC ........ *G06F 9/4401* (2013.01); *G06F 9/44505* (2013.01); *G06F 21/1011* (2023.08); *G06F 21/121* (2013.01); *G06F 21/44* (2013.01); *H04L 63/083* (2013.01); *H04L 63/102* (2013.01); *H04L 2463/103* (2013.01)

(58) Field of Classification Search
CPC .............. G06F 9/4401; G06F 9/44505; G06F 21/1011; G06F 21/121; G06F 21/44; H04L 2463/103; H04L 63/083; H04L 63/102
See application file for complete search history.

(56) References Cited

U.S. PATENT DOCUMENTS

| 2014/0108657 A1* | 4/2014 | O'Connor | .............. G06Q 30/06 |
| | | | 709/226 |
| 2018/0260539 A1* | 9/2018 | Puri | ........................ G06F 21/44 |

* cited by examiner

*Primary Examiner* — Terrell S Johnson
(74) *Attorney, Agent, or Firm* — Fogarty LLP

(57)　ABSTRACT

Systems and methods for providing a secure motherboard replacement are described. In some embodiments, an Information Handling System (IHS) may include a processor and a memory coupled to the processor, the memory having program instructions that, upon execution, cause the IHS to, when a replacement motherboard is booted for the first time, attach to a device that stores one or more BIOS entitlements associated with the IHS, configure a BIOS on the replacement motherboard with the BIOS entitlements, and complete booting of the IHS into a normal mode of operation.

20 Claims, 5 Drawing Sheets

100

ONLINE VENDOR SUPPORT PORTAL

122

120B

IHS INVENTORY LOG

106

104

116

120

VENDOR SITE

102

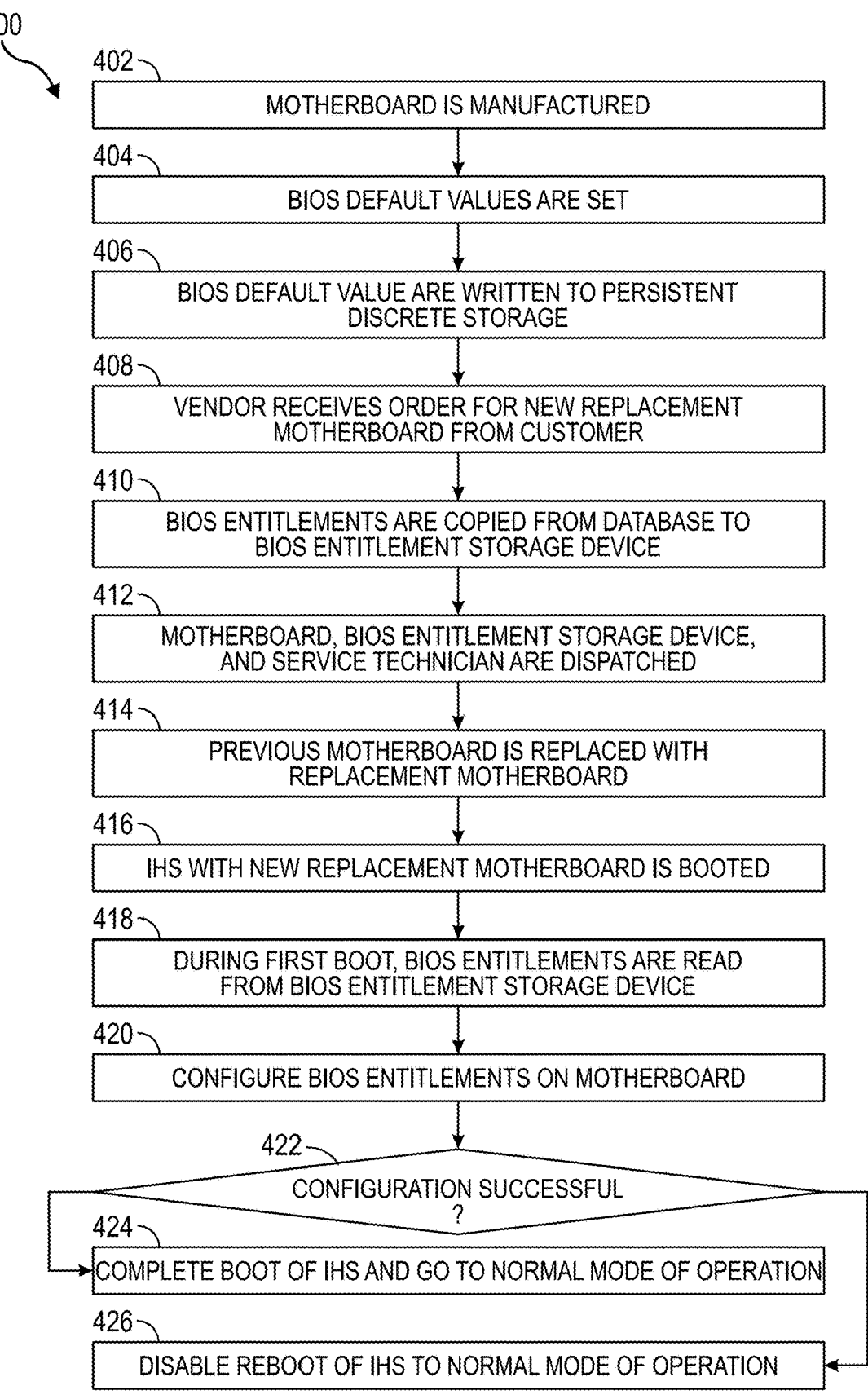

400

402 — MOTHERBOARD IS MANUFACTURED

404 — BIOS DEFAULT VALUES ARE SET

406 — BIOS DEFAULT VALUE ARE WRITTEN TO PERSISTENT DISCRETE STORAGE

408 — VENDOR RECEIVES ORDER FOR NEW REPLACEMENT MOTHERBOARD FROM CUSTOMER

410 — BIOS ENTITLEMENTS ARE COPIED FROM DATABASE TO BIOS ENTITLEMENT STORAGE DEVICE

412 — MOTHERBOARD, BIOS ENTITLEMENT STORAGE DEVICE, AND SERVICE TECHNICIAN ARE DISPATCHED

414 — PREVIOUS MOTHERBOARD IS REPLACED WITH REPLACEMENT MOTHERBOARD

416 — IHS WITH NEW REPLACEMENT MOTHERBOARD IS BOOTED

418 — DURING FIRST BOOT, BIOS ENTITLEMENTS ARE READ FROM BIOS ENTITLEMENT STORAGE DEVICE

420 — CONFIGURE BIOS ENTITLEMENTS ON MOTHERBOARD

422 — CONFIGURATION SUCCESSFUL ?

424 — COMPLETE BOOT OF IHS AND GO TO NORMAL MODE OF OPERATION

426 — DISABLE REBOOT OF IHS TO NORMAL MODE OF OPERATION

FIG. 4

SECURE MOTHERBOARD REPLACEMENT SYSTEM AND METHOD

BACKGROUND

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

One particular business aspect that has benefited from cloud based service models has been customer service. Corporations have invested relatively large amounts of resources to ensure their products are readily available and that their customers receive the best service. While it is known that customer relations do not end with the sale of the product, servicing customers after the purchase of a product can also be a major challenge to the vendor or manufacturer of that product. For example, the product or a component of that product provided by the vendor may require repair and/or replacement after the product is placed in service at the customer site. It would be beneficial to the vendor to ensure that any faulty products or product components are promptly repaired and/or replaced to ensure customer satisfaction.

In most IHSs, low-level code is used as an intermediary between hardware components and the Operating System (OS), as well as other high-level software. In some IHSs, this low-level code is known as the Basic Input/Output System (BIOS). The BIOS provides a set of software routines that allow high-level software to interact with hardware components using standard calls. Because of certain limitations of the original BIOS, a new specification for creating code that is responsible for booting the IHS has been developed that is called the Extensible Firmware Interface (EFI) Specification, and which has been extended by the Unified Extensible Firmware Interface Forum (UEFI).

The EFI Specification describes an interface between the OS and the system firmware. In particular, the EFI Specification defines the interface that platform firmware must implement and the interface that the OS may use in booting. The EFI Specification also specifies that protocols should be provided for EFI drivers to communicate with each other. An EFI protocol is an interface definition provided by an EFI driver. The EFI core provides protocols for allocation of memory, creating events, setting the clock, and the like.

Computer motherboards typically include firmware and an associated firmware interface, such as a basic input/output system (BIOS) or unified extensible firmware interface (UEFI). Users can configure the firmware after purchase beyond the motherboard's default settings. Firmware can also be customized for various configurations or purposes. For example, a rack server may be sold to different customers in which each customer has unique configuration settings. Additionally, a vendor can preload different configurations stored in firmware in advance for different customers.

SUMMARY

Systems and methods for providing a secure motherboard replacement are described. In some embodiments, an Information Handling System (IHS) may include a processor and a memory coupled to the processor, the memory having program instructions that, upon execution, cause the IHS to, when a replacement motherboard is booted for the first time, attach to a device that stores one or more Basic Input/Output System (BIOS) entitlements associated with the IHS, configure a BIOS on the replacement motherboard with the BIOS entitlements, and complete booting of the IHS into a normal mode of operation.

According to another embodiment, a motherboard replacement method includes the steps of, when a replacement motherboard is booted for the first time, attaching to a device that stores one or more BIOS entitlements associated with an IHS, configure a BIOS on the replacement motherboard with the BIOS entitlements, and complete booting of the IHS into a normal mode of operation.

According to yet another embodiment, a BIOS having program instructions stored thereon that, upon execution by an IHS, cause the IHS to, when a replacement motherboard is booted for the first time, attach to a device that stores one or more BIOS entitlements associated with the IHS, configure a BIOS on the replacement motherboard with the BIOS entitlements, and complete booting of the IHS into a normal mode of operation.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

FIG. 4 illustrates an example motherboard replacement method that may be performed to transfer BIOS entitlements to a newly installed motherboard according to one embodiment of the present disclosure.

DETAILED DESCRIPTION

Figure 1A:
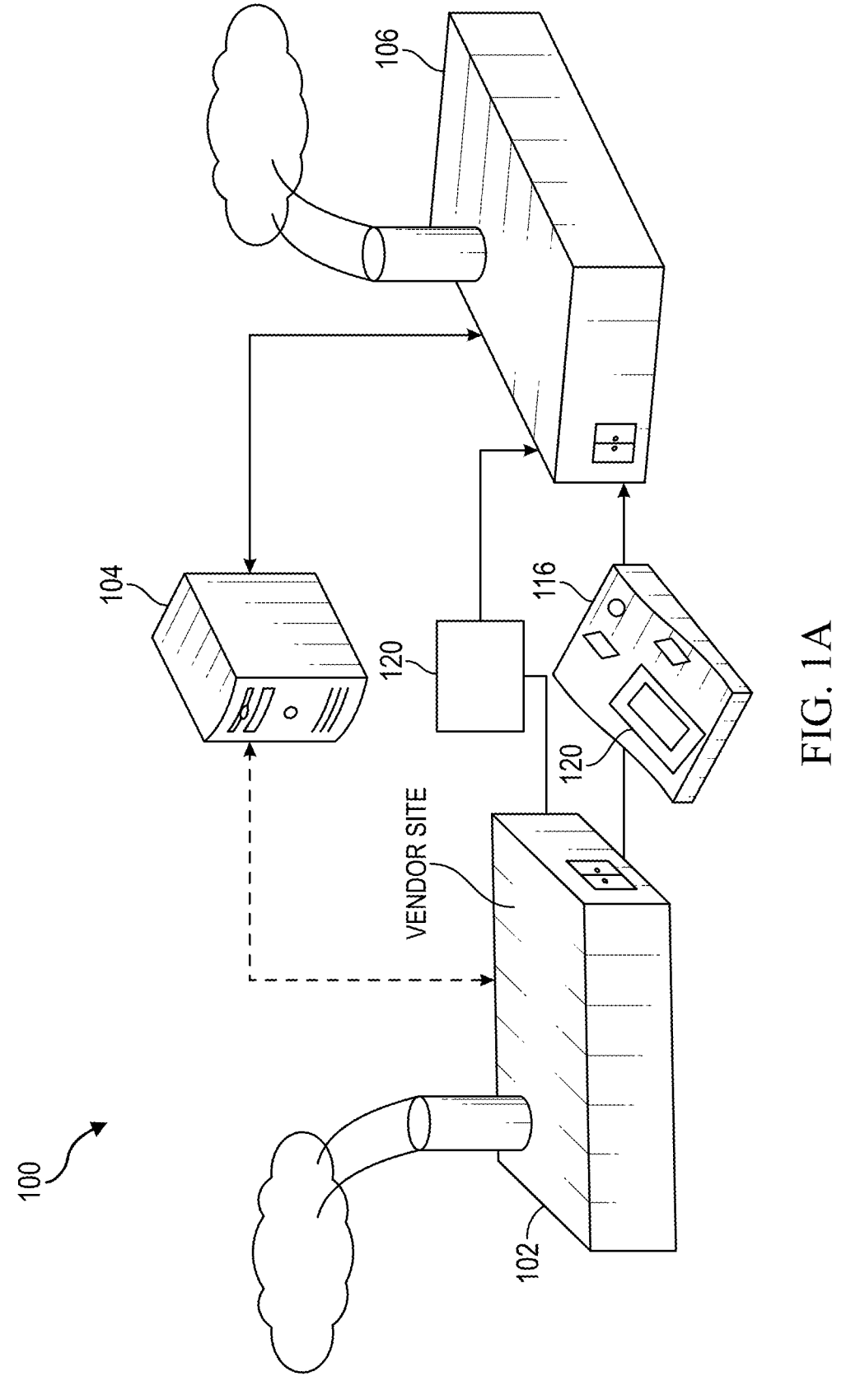
FIGS. 1A and 1B illustrate several embodiments of an example secure motherboard replacement system according to one embodiment of the present disclosure.

The present disclosure is described with reference to the attached figures. The figures are not drawn to scale, and they are provided merely to illustrate the disclosure. Several aspects of the disclosure are described below with reference to example applications for illustration. It should be understood that numerous specific details, relationships, and methods are set forth to provide an understanding of the disclosure. The present disclosure is not limited by the illustrated ordering of acts or events, as some acts may occur in different orders and/or concurrently with other acts or events. Furthermore, not all illustrated acts or events are required to implement a methodology in accordance with the present disclosure.

System hardware components of an IHS, such as CPUs, DIMMs, PICe Cards (e.g., Graphics, Network, WiFi, etc.), SSD/HDD devices and the like may need replacement and/or updating for assorted reasons, such as to enable an upgrade to a faster processor, faster memory, and/or faster graphics. Other reasons for replacing components may be to support the latest internal bus technologies, such as ATA/133 or Serial ATA, to enable to use external peripherals using USB or FireWire technology, to increase expansion slot potential, and the like. Additionally, a motherboard upgrade may also be performed for distinct reasons, including to meet latest technology requirements.

A motherboard can be considered to be the backbone of an IHS; that is, one that provides a platform for connecting many components (e.g., CPU, GPU, memory, etc.) and peripheral devices (e.g., NIC cards) used by the IHS. The motherboard can be important both in terms of system performance and connectivity. Nevertheless, motherboard replacement can be a burdensome affair, particularly due to custom settings that need to be transferred from the previous motherboard to the replacement motherboard. For example, firmware (e.g., BIOS, UEFI, etc.) on an Information Handling System (IHS) can be customized from its default settings. If a particular default setting is not what a user desires, the user may be required to perform multiple steps on multiple machines to reconfigure the firmware. For example, the customer may be required to search for or create a configuration update file for use with the firmware manipulation or flashing utility. Then the specific procedures for that motherboard and/or firmware should be followed to install the configuration update file, such as a firmware update to flash the BIOS. This process, however, can present difficulties in cost and time to deploy, as well as pose a risk that the process does not complete properly and renders the firmware unusable. These risks may be compounded when a customer desires to update or configure new default firmware settings on multiple devices.

For IHS vendors, Reliable, Accessible and Serviceable (RAS) is a key pillar of product quality and providing seamless, secure, and reduced downtime possesses significant value to IHS customers and addresses their current pain points reported for part replacement scenarios. For example, DELL TECHNOLOGIES, which is a vendor of high quality IHSs that span across a broad range of product offerings, has reported approximately 3.2 million motherboard replacements in the field during fiscal year 2022, and each motherboard replacement has yielded a pain point due to the necessity of manually migrating the custom BIOS and/or UEFI settings from the previous motherboard to the replacement motherboard.

The motherboard may fail for several reasons, thus needing replacement. For example, electrical spikes and surges caused by problems with electrical wiring, problems with the power service outside the house, or the result of a lightning strike may damage the motherboard to the point that it needs replacement. Additionally, dust, pet hair and debris may block air circulation that keeps the machine cool, thus causing the motherboard to overheat. Overheating of the motherboard can also occur due to gaming, rendering video, watching videos, fluctuations in power supply, laptop heatsink blocked with dust, and the like. The motherboard may also incur manufacturer design defects. Motherboards are mass produced and there are chances that manufacturing defects may occur. Another motherboard failure may include a Power On Self-Test (POST) failure in which the IHS does not boot to DXE phase due to SPI flash corruption, a condition whose only option may be to dispatch a new motherboard for replacement.

After the motherboard is dispatched using conventional techniques, there has heretofore been no intelligence available to copy the BIOS entitlements of a previous motherboard to a new replacement motherboard. Example BIOS entitlements may include any flash update revision checks, BKC attributes, OS/VM context configurations, and the like. If the motherboard replacement is not handled properly, the certificates/keys inside the UEFI secure boot database may be lost such that the security context cannot be restored back to the same level as on with faulty motherboard. Additionally, if BIOS Security configurations (e.g., Secure Boot/TPM On/Thunderbolt Security, Custom Boot Order variables, etc.) are not restored, then platform custom security settings may be restored to factory defaults such that the user sees a change in security behavior. Firmware actions to previously reported telemetry events, such as firmware tampering, Root of Trust (ROT), and the like may be lost, and thus firmware remediation actions will become difficult while unexpected behavior may be observed on the IHS. Upon loosing vendor support (e.g., SupportAssist or Excalibur profiles), BIOSConnect URLs, HTTPs TLS certificates, the platform may lose the capability of recovery remediation functionality, thus needing to be reconfigured again. Considering a virtual environment, the host Operating System (OS) and Virtual Machine (VM) settings saved into UEFI NVRAM would be set to factory default, which forces the user to reconfigure the settings. As will be described in detail herein below, embodiments of the present disclosure provide a solution to the aforementioned problems, among others, using a seamless and secure motherboard replacement system and method that transfers BIOS entitlements associated with a motherboard that is being replaced to a replacement motherboard in a secure manner.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory.

Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components. An example of an IHS is described in more detail below.

Figure 1B:
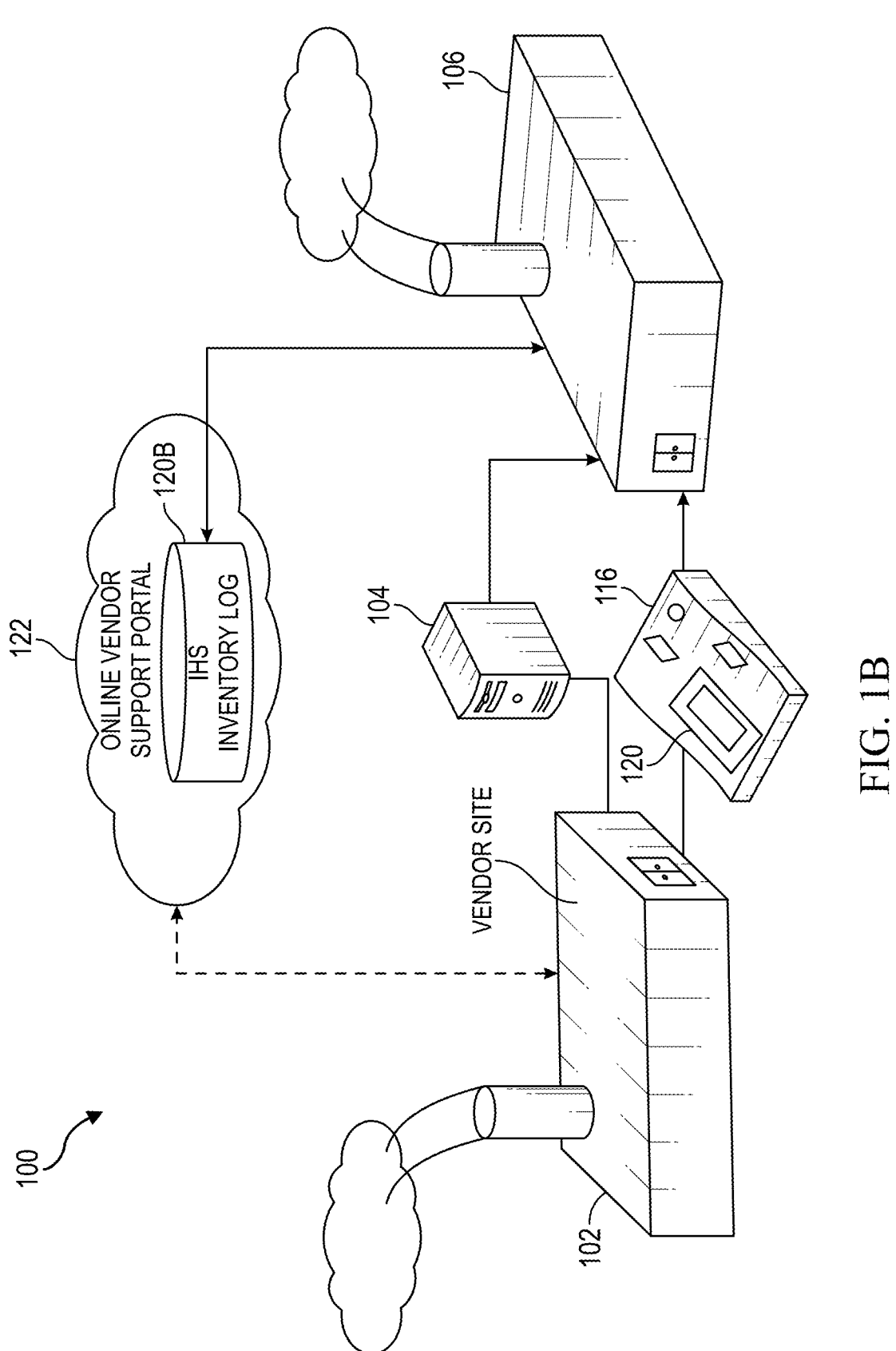

FIGS. 1A and 1B illustrate several embodiments of an example secure motherboard replacement system 100 that may provide a solution to the aforementioned problems with traditional motherboard replacement systems according to one embodiment of the present disclosure. The system 100 generally involves a vendor at a vendor site 102 that provides an IHS 104 to a customer at a customer site 106.

In the event that the IHS 104 needs to have its motherboard replaced, the vendor issues a replacement motherboard 116 to the customer at the customer site 106. Referring initially to FIG. 1A, before shipping the replacement motherboard, the vendor generates a BIOS entitlement transferal device 120 that stores BIOS entitlements associated with the IHS 104 along with the replacement to the customer site 106. For example, if the motherboard 116 needs to be replaced, the customer may issue an order to the vendor which includes a unique identifier (e.g., serial number) associated with the IHS 104. The vendor may then access a database that stores BIOS entitlement information about that particular IHS 104, and copies it to the BIOS entitlement transferal device 120. When the motherboard 116 and BIOS entitlement transferal device 120 are received at the customer site 106, the customer or a vendor service person may use the BIOS entitlement transferal device 120 to copy the BIOS entitlement information to the motherboard 116 after it has been installed in the IHS 104.

In one embodiment, the BIOS entitlement transferal device 120 may be a secure USB flash drive (e.g., thumb drive, memory stick, pen drive, etc.) that stores the BIOS entitlements. Thus, when the motherboard 116 is installed in the IHS 104, the USB flash drive BIOS entitlement transferal device 120 may be inserted into an available USB port so that the BIOS entitlements can be transferred. In another embodiment, the BIOS entitlement transferal device 120 may be a wireless device, such as an NFC token, a Bluetooth token, Ultra-Wide Band (UWB) device that wirelessly communicates with the newly installed motherboard 116 to transfer the BIOS entitlements to the motherboard 116. In yet another embodiment, the BIOS entitlement transferal device 120 may be a Joint Test Action Group (JTAG) device that stores the BIOS entitlements and transfers them to the motherboard 116 via an available JTAG port configured on the motherboard 116.

Referring now to FIG. 1B, another embodiment of the motherboard replacement system 100 is shown in which an online vendor support portal 122 may be used to copy BIOS entitlement information to a newly installed motherboard 116. The vendor site 102 is associated with an online vendor support portal 122 managed by the vendor. The online vendor support portal 122 includes an IHS inventory log 120*b* that may be considered to be a BIOS entitlement transferal device in that it may be used to transfer BIOS entitlements to the newly installed motherboard 116. The vendor support portal 122 may be, for example, a support website managed by the vendor that manufactures and sells the IHS 104 to the customer. In this particular embodiment, when the replacement motherboard 116 is booted for the first time, the IHS 104 may attempt to log on to the online vendor support portal 122 and retrieve BIOS entitlement information uniquely associated with that IHS 104. Additional details associated with how the BIOS entitlements are transferred will be described in detail herein below.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory.

Figure 2:
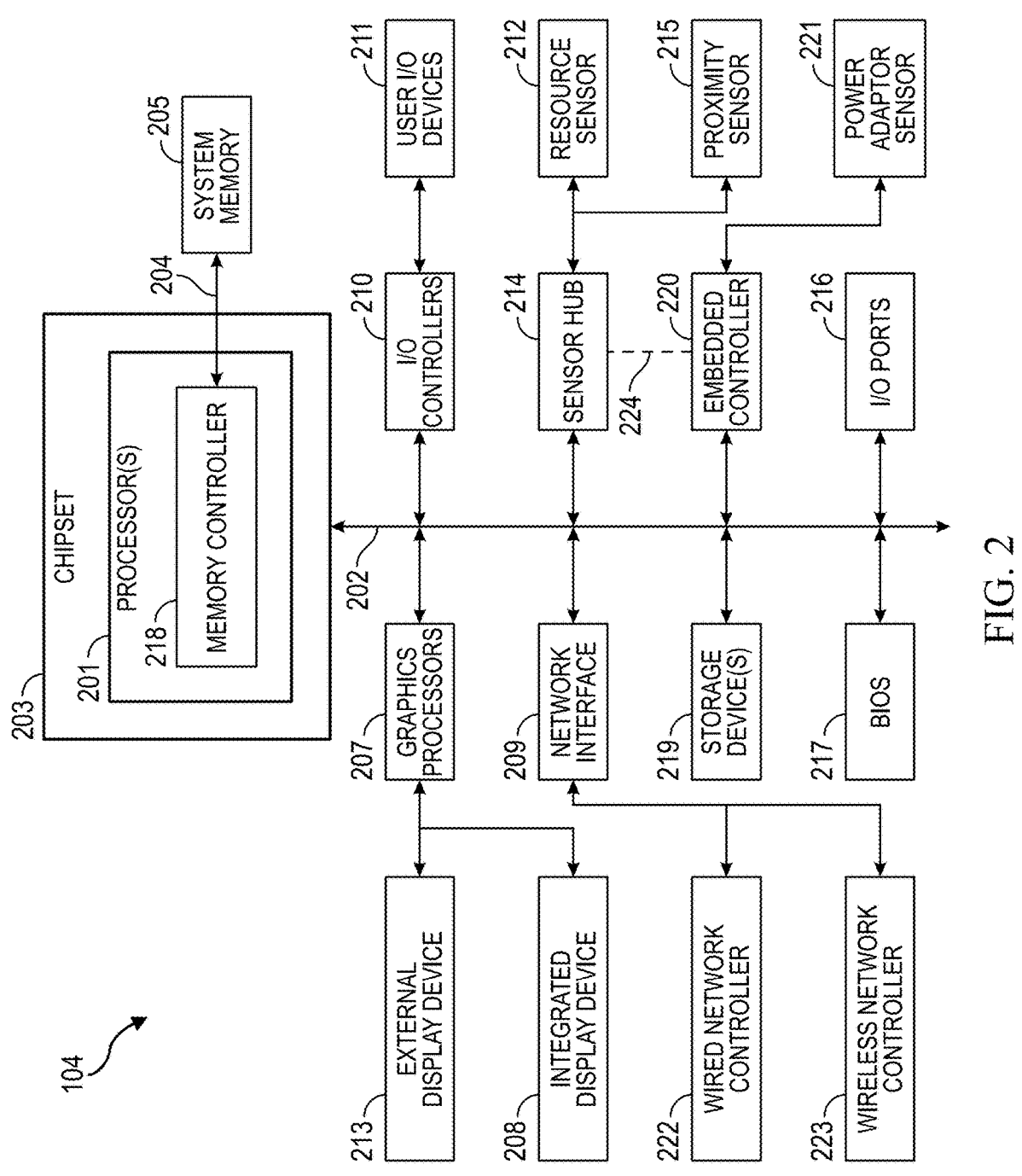
FIG. 2 is a block diagram illustrating components of an example IHS that may be configured to provide a secure motherboard replacement system according to one embodiment of the present disclosure.

FIG. 2 is a block diagram illustrating components of an example IHS 104 that may be configured to provide a secure motherboard replacement system according to one embodiment of the present disclosure. For example, IHS 104 may be incorporated in whole, or part, as IHS 104 of FIG. 1. As shown, IHS 104 includes one or more processors 201, such as a Central Processing Unit (CPU), that execute code retrieved from system memory 205. Although IHS 104 is illustrated with a single processor 201, other embodiments may include two or more processors, that may each be configured identically, or to provide specialized processing operations. Processor 201 may include any processor capable of executing program instructions, such as an Intel Pentium™ series processor or any general-purpose or embedded processors implementing any of a variety of Instruction Set Architectures (ISAs), such as the x86, POWERPC®, ARM®, SPARC®, or MIPS® ISAs, or any other suitable ISA.

In the embodiment of FIG. 2, processor 201 includes an integrated memory controller 218 that may be implemented directly within the circuitry of processor 201, or memory controller 218 may be a separate integrated circuit that is located on the same die as processor 201. Memory controller 218 may be configured to manage the transfer of data to and from the system memory 205 of IHS 104 via high-speed memory interface 204. System memory 205 that is coupled to processor 201 provides processor 201 with a high-speed memory that may be used in the execution of computer program instructions by processor 201.

Accordingly, system memory 205 may include memory components, such as static RAM (SRAM), dynamic RAM (DRAM), NAND Flash memory, suitable for supporting high-speed memory operations by the processor 201. In certain embodiments, system memory 205 may combine both persistent, non-volatile memory and volatile memory. In certain embodiments, system memory 205 may include multiple removable memory modules.

IHS 104 utilizes chipset 203 that may include one or more integrated circuits that are connected to processor 201. In the embodiment of FIG. 2, processor 201 is depicted as a component of chipset 203. In other embodiments, all of chipset 203, or portions of chipset 203 may be implemented directly within the integrated circuitry of the processor 201. Chipset 203 provides processor(s) 201 with access to a variety of resources accessible via bus 202. In IHS 104, bus 202 is illustrated as a single element. Various embodiments may utilize any number of separate buses to provide the illustrated pathways served by bus 202.

In various embodiments, IHS 104 may include one or more I/O ports 216 that may support removable couplings with diverse types of external devices and systems, including removable couplings with peripheral devices that may be configured for operation by a particular user of IHS 104. For instance, I/O 216 ports may include USB (Universal Serial Bus) ports, by which a variety of external devices may be coupled to IHS 104. In addition to or instead of USB ports, I/O ports 216 may include diverse types of physical I/O ports that are accessible to a user via the enclosure of the IHS 104.

In certain embodiments, chipset 203 may additionally utilize one or more I/O controllers 210 that may each support the operation of hardware components such as user I/O devices 211 that may include peripheral components that are physically coupled to I/O port 216 and/or peripheral components that are wirelessly coupled to IHS 104 via network interface 209. In various implementations, I/O controller 210 may support the operation of one or more user I/O devices 211 such as a keyboard, mouse, touchpad, touchscreen, microphone, speakers, camera and other input and output devices that may be coupled to IHS 104. User I/O devices 211 may interface with an I/O controller 210 through wired or wireless couplings supported by IHS 104. In some cases, I/O controllers 210 may support configurable operation of supported peripheral devices, such as user I/O devices 211.

As illustrated, a variety of additional resources may be coupled to the processor(s) 201 of the IHS 104 through the chipset 203. For instance, chipset 203 may be coupled to network interface 209 that may support diverse types of network connectivity. IHS 104 may also include one or more Network Interface Controllers (NICs) 222 and 223, each of which may implement the hardware required for communicating via a specific networking technology, such as Wi-Fi, BLUETOOTH, Ethernet and mobile cellular networks (e.g., CDMA, TDMA, LTE). Network interface 209 may support network connections by wired network controllers 222 and wireless network controllers 223. Each network controller 222 and 223 may be coupled via various buses to chipset 203 to support diverse types of network connectivity, such as the network connectivity utilized by IHS 104.

Chipset 203 may also provide access to one or more display device(s) 208 and 213 via graphics processor 207. Graphics processor 207 may be included within a video card, graphics card or within an embedded controller installed within IHS 104. Additionally, or alternatively, graphics processor 207 may be integrated within processor 201, such as a component of a system-on-chip (SoC). Graphics processor 207 may generate Display information and provide the generated information to one or more Display device(s) 208 and 213, coupled to IHS 104.

One or more Display devices 208 and 213 coupled to IHS 104 may utilize LCD, LED, OLED, or other Display technologies. Each Display device 208 and 213 may be capable of receiving touch inputs such as via a touch controller that may be an embedded component of the Display device 208 and 213 or graphics processor 207, or it may be a separate component of IHS 104 accessed via bus 202. In some cases, power to graphics processor 207, integrated Display device 208 and/or external Display device 213 may be turned off, or configured to operate at minimal power levels, in response to IHS 104 entering a low-power state (e.g., standby).

As illustrated, IHS 104 may support an integrated Display device 208, such as a Display integrated into a laptop, tablet, 2-in-1 convertible device, or mobile device. IHS 104 may also support use of one or more external Display devices 213, such as external monitors that may be coupled to IHS 104 via distinct types of couplings, such as by connecting a cable from the external Display devices 213 to external I/O port 216 of the IHS 104. In certain scenarios, the operation of integrated displays 208 and external displays 213 may be configured for a particular user. For instance, a particular user may prefer specific brightness settings that may vary the Display brightness based on time of day and ambient lighting conditions.

Chipset 203 also provides processor 201 with access to one or more storage devices 219. In various embodiments, storage device 219 may be integral to IHS 104 or may be external to IHS 104. In certain embodiments, storage device 219 may be accessed via a storage controller that may be an integrated component of the storage device. Storage device 219 may be implemented using any memory technology allowing IHS 104 to store and retrieve data. For instance, storage device 219 may be a magnetic hard disk storage drive or a solid-state storage drive. In certain embodiments, storage device 219 may be a system of storage devices, such as a cloud system or enterprise data management system that is accessible via network interface 209.

As illustrated, IHS 104 also includes Basic Input/Output System (BIOS) 217 that may be stored in a non-volatile memory accessible by chipset 203 via bus 202. Upon powering or restarting IHS 104, processor(s) 201 may utilize BIOS 217 instructions to initialize and test hardware components coupled to the IHS 104. BIOS 217 instructions may also load an operating system (OS) (e.g., WINDOWS, MACOS, iOS, ANDROID, LINUX, etc.) for use by IHS 104.

BIOS 217 provides an abstraction layer that allows the operating system to interface with the hardware components of the IHS 104. The Unified Extensible Firmware Interface (UEFI) was designed as a successor to BIOS. As a result, many modern IHSs utilize UEFI in addition to or instead of a BIOS. As used herein, BIOS is intended to also encompass UEFI.

As illustrated, certain IHS 104 embodiments may utilize sensor hub 214 capable of sampling and/or collecting data from a variety of sensors. For instance, sensor hub 214 may utilize hardware resource sensor(s) 212, which may include electrical current or voltage sensors, and that are capable of determining the power consumption of various components of IHS 104 (e.g., CPU 201, GPU 207, system memory 205, etc.). In certain embodiments, sensor hub 214 may also include capabilities for determining a location and movement of IHS 104 based on triangulation of network signal information and/or based on information accessible via the OS or a location subsystem, such as a GPS module.

In some embodiments, sensor hub 214 may support proximity sensor(s) 215, including optical, infrared, and/or sonar sensors, which may be configured to provide an indication of a user's presence near IHS 104, absence from IHS 104, and/or distance from IHS 104 (e.g., near-field, mid-field, or far-field).

In certain embodiments, sensor hub 214 may be an independent microcontroller or other logic unit that is coupled to the motherboard of IHS 104. Sensor hub 214 may be a component of an integrated system-on-chip incorporated into processor 201, and it may communicate with chipset 203 via a bus connection such as an Inter-Integrated Circuit (I$^2$C) bus or other suitable type of bus connection. Sensor hub 214 may also utilize an I$^2$C bus for communicating with various sensors supported by IHS 104.

As illustrated, IHS 104 may utilize embedded controller (EC) 220, which may be a motherboard component of IHS 104 and may include one or more logic units. In certain embodiments, EC 220 may operate from a separate power plane from the main processors 201 and thus the OS operations of IHS 104. Firmware instructions utilized by EC 220 may be used to operate a secure execution system that may include operations for providing various core functions of IHS 104, such as power management, management of operating modes in which IHS 104 may be physically configured and support for certain integrated I/O functions.

EC 220 may also implement operations for interfacing with power adapter sensor 221 in managing power for IHS 104. These operations may be utilized to determine the power status of IHS 104, such as whether IHS 104 is operating from battery power or is plugged into an AC power source (e.g., whether the IHS is operating in AC-only mode, DC-only mode, or AC+DC mode). In some embodiments, EC 220 and sensor hub 214 may communicate via an out-of-band signaling pathway or bus 224.

In various embodiments, IHS 104 may not include each of the components shown in FIG. 2. Additionally, or alternatively, IHS 104 may include various additional components in addition to those that are shown in FIG. 2. Furthermore, some components that are represented as separate components in FIG. 2 may in certain embodiments instead be integrated with other components. For example, in certain embodiments, all or a portion of the functionality provided by the illustrated components may instead be provided by components integrated into the one or more processor(s) 201 as an SoC.

Figure 3:
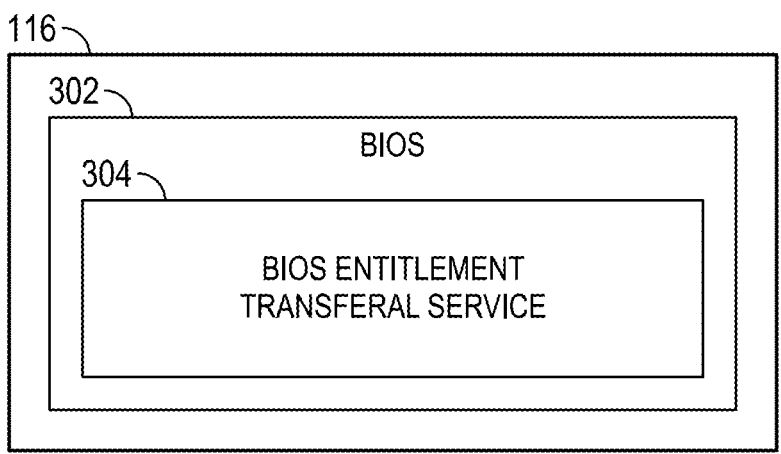
FIG. 3 illustrates several components of the motherboard that may be used to implement the secure motherboard replacement system according to one embodiment of the present disclosure.

FIG. 3 illustrates several components of the motherboard 116 that may be used to implement the secure motherboard replacement system 100 according to one embodiment of the present disclosure. The motherboard 116 includes a BIOS 302 that stores a BIOS entitlement transferal service 304. The BIOS entitlement transferal service 304 generally includes executable instructions stored in a BIOS portion of memory. While the BIOS entitlement transferal service 304 is shown as being implemented on a BIOS 302 portion of the motherboard 116, it should be appreciated that the BIOS entitlement transferal service 304 may be implemented on any suitable component of the motherboard 116, such as on the embedded controller 220 as described above with reference to FIG. 2.

When the IHS 104 is booted with the replacement motherboard 116 for the first time, the BIOS entitlement transferal service 304 may provide certain actions to have the BIOS entitlements uniquely associated with the IHS 104 to be transferred to the motherboard 116. For example, the BIOS entitlement transferal service 304 may place the IHS 104 in a service mode in which normal operation of the IHS 104 is inhibited until the BIOS entitlements are successfully transferred. Additionally, the BIOS entitlement transferal service 304 may attempt to communicate with the BIOS entitlement transferal device 120 in order to have the entitlements for that IHS 104 transferred. In one embodiment, the BIOS entitlements may be encrypted on the device 120 so that their contents cannot be manipulated or otherwise corrupted in any manner. For example, the BIOS entitlement transferal service 304 may include an encryption key that may be used to decrypt the encrypted BIOS entitlement information stored on the BIOS entitlement transferal device 120. If the BIOS entitlement transferal device 120*a* is used, the BIOS entitlement transferal service 304 may control the I/O controller 210 or I/O ports 216 (see FIG. 2) to communicate with the BIOS entitlement transferal device 120*a*. Additionally, the BIOS entitlement transferal service 304 may inhibit the IHS 104 from communicating with any other device via the I/O controller 210 or I/O ports 216 until the BIOS entitlements have been successfully transferred. If the BIOS entitlement transferal device 120*b* is used, however, the IHS 104 may be limited to only communicating with the BIOS entitlement transferal device 120*b* until the correct BIOS entitlements are transferred.

FIG. 4 illustrates an example motherboard replacement method 400 that may be performed to transfer BIOS entitlements to a newly installed motherboard 116 according to one embodiment of the present disclosure. Additionally or alternatively, the method 400 may be performed in whole or in part by the motherboard replacement system 300 described above with reference to FIG. 3. The method 400 may be performed at any suitable time, such as during a boot process and before normal operation of the IHS 104 is allowed to occur.

Steps 402-406 generally described actions that may be taken during manufacture of the motherboard 116. At step 402, the motherboard is manufactured. Thereafter at step 404, the BIOS default values are set in the motherboard 116, and at step 406, BIOS default values are written to a storage (e.g., persistent discrete storage) on the motherboard 116.

Steps 408-414 generally describe steps that may be taken to replace the previously installed motherboard with the new motherboard 116. At step 408, the vendor (e.g., manufacturer of the motherboard 116) receives an order for a new replacement motherboard 116 from the customer. At step 410, the BIOS entitlements are copied from the database 110 to BIOS entitlement storage device 120. In one embodiment, the BIOS entitlements may be copied from the previously installed motherboard before it is removed from the IHS 104. Thereafter at step 412, the motherboard 116, BIOS entitlement storage device 120, and service technician are dispatched to the customer site. In some embodiments, the motherboard 116 and BIOS entitlement transferal device 120 may be sent to the customer site so that the customer can perform the replacement. At step 414, the previous motherboard is replaced with replacement motherboard 116.

Steps 416-426 describe certain steps that may be taken to transfer the BIOS entitlements to the newly installed motherboard 116. In one embodiment, steps 416-426 may be taken during a first boot of the replacement motherboard 116. At step 416, the IHS 104 is booted with new replacement motherboard 116. In other embodiments, steps 416-426 may be performed at any time in which normal operation of the IHS 104 is inhibited. During first boot, BIOS entitlements are read from BIOS entitlement storage device 120 at step 418. In one embodiment, the motherboard replacement method 400 may decrypt BIOS entitlements that have been stored on the BIOS entitlement transferal device 120. At step 420, the motherboard replacement method 400 may configure BIOS entitlements on motherboard. At step 422, the motherboard replacement method 400 may determine whether the configuration is successful. For example, the BIOS entitlement transferal service 304 may perform a sanity check to ensure certain combinations of BIOS entitlements are consistent with one another. Furthering this example, the BIOS entitlement transferal service 304 may verify that the BIOS entitlements are consistent with a certain type of customer. If the BIOS entitlements configuration is successful, the motherboard replacement method 400 completes booting the IHS 104 such that it goes into a normal mode of operation at step 424. If, however, the configuration is not successful, booting of the IHS 104 is disabled and the booting the IHS 104 is halted. At this point, the service technician may perform one or more remedial actions to correct the incorrect configuration so that the IHS 104 may be allowed to go to a normal mode of operation.

The aforedescribed motherboard replacement method 400 may be performed each time a motherboard 116 is used to replace a previously installed motherboard in an IHS 104. Nevertheless, when use of the 400 is no longer needed or desired, the motherboard replacement method 400 ends.

Although FIG. 4 describes an example method 400 that may be performed to replace a previously installed motherboard in an IHS 104, the features of the method 400 may be embodied in other specific forms without deviating from the spirit and scope of the present disclosure. For example, the method 400 may perform additional, fewer, or different operations than those described in the present example. For another example, the method 400 may be performed in a sequence of steps different from that described above. As yet another example, certain steps of the method 400 may be performed by other components in the IHS 100 other than those described above.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," when used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS), comprising:
   a processor; and
   a memory coupled to the processor, the memory having program instructions stored thereon that, upon execution, cause the IHS to, when a replacement motherboard is booted for the first time:
   attach to a device that stores one or more Basic Input/Output System (BIOS) entitlements associated with the IHS;
   configure a BIOS on the replacement motherboard with the BIOS entitlements; and
   complete booting of the IHS into a normal mode of operation.

2. The IHS of claim 1, wherein the program instructions, upon execution, further cause the IHS to attach to a USB flash drive to obtain the BIOS entitlements.

3. The IHS of claim 1, wherein the program instructions, upon execution, further cause the IHS to attach to a wireless device to obtain the BIOS entitlements.

4. The IHS of claim 3, wherein the wireless device comprises one of an Ultra-Wide Band (UWB) device, a Bluetooth device, or a Near Field Communication (NFC) device.

5. The IHS of claim 1, wherein the program instructions, upon execution, further cause the IHS to attach to the device using a Joint Test Action Group (JTAG) port to obtain the BIOS entitlements.

6. The IHS of claim 1, wherein the program instructions, upon execution, further cause the IHS to communicate with an online cloud server to obtain the BIOS entitlements.

7. The IHS of claim 1, wherein the BIOS entitlements are encrypted on the device.

8. The IHS of claim 1, wherein the program instructions are stored in a BIOS portion of the replacement motherboard.

9. The IHS of claim 1, wherein the program instructions, upon execution, further cause the IHS to:
   determine whether the BIOS entitlements are successfully transferred to the motherboard; and
   enable the motherboard to complete booting to the normal mode of operation only when the BIOS entitlements are successfully transferred.

10. A motherboard replacement method comprising:
    when a replacement motherboard is booted for the first time:
    attaching to a device that stores one or more Basic Input/Output System (BIOS) entitlements associated with an Information Handling System (HIS);
    configure a BIOS on the replacement motherboard with the BIOS entitlements; and
    complete booting of the IHS into a normal mode of operation.

11. The motherboard replacement method of claim 10, further comprising wherein the program instructions, upon execution, further cause the IHS to attach to a USB flash drive to obtain the BIOS entitlements.

12. The motherboard replacement method of claim 10, further comprising attaching to a wireless device to obtain the BIOS entitlements.

13. The motherboard replacement method of claim 10, further comprising attaching to the device using a Joint Test Action Group (JTAG) port to obtain the BIOS entitlements.

14. The motherboard replacement method of claim 10, further comprising communicating with an online cloud server to obtain the BIOS entitlements.

15. The motherboard replacement method of claim 10, further comprising encrypting the BIOS entitlements on the device.

16. The motherboard replacement method of claim 10, further comprising:

determining whether the BIOS entitlements are successfully transferred to the motherboard; and enabling the motherboard to complete booting to the normal mode of operation only when the BIOS entitlements are successfully transferred.

17. A Basic I/O System (BIOS) having program instructions stored thereon that, upon execution by an Information Handling System (IHS), cause the IHS to, when a replacement motherboard is booted for the first time:

attach to a device that stores one or more BIOS entitlements associated with the IHS;

configure a BIOS on the replacement motherboard with the BIOS entitlements; and complete booting of the IHS into a normal mode of operation.

18. The BIOS of claim 17, wherein the program instructions, upon execution, further cause the IHS to attach to a USB flash drive to obtain the BIOS entitlements.

19. The BIOS of claim 17, wherein the program instructions, upon execution, further cause the IHS to attach to a wireless device to obtain the BIOS entitlements.

20. The BIOS of claim 17, wherein the program instructions, upon execution, further cause the IHS to communicate with an online cloud server to obtain the BIOS entitlements.

\* \* \* \* \*